(12) United States Patent
Lee (10) Patent No.: US 9,838,988 B2
(45) Date of Patent: Dec. 5, 2017

(54) DEVICE AND METHOD FOR TIME DELAY FINE-TUNING UTP FEMTO DISTRIBUTION AND RELAY

(71) Applicants: TJ INNOVATION CO., LTD., Bucheon-si, Gyeonggi-do (KR); CONTELA, INC., Seongnam-si, Gyeonggi-do (KR); SEOHWA TELECOM CO., LTD., Seoul (KR)

(72) Inventor: Ju Dong Lee, Seoul (KR)

(73) Assignee: CONTELA, INC., Seongnam-si (KR)

(*) Notice: Subject to any disclaimer, the term of this patent is extended or adjusted under 35 U.S.C. 154(b) by 163 days.

(21) Appl. No.: 14/902,243

(22) PCT Filed: Aug. 16, 2013

(86) PCT No.: PCT/KR2013/007366
§ 371 (c)(1),
(2) Date: Dec. 30, 2015

(87) PCT Pub. No.: WO2015/002343
PCT Pub. Date: Jan. 8, 2015

(65) Prior Publication Data
US 2016/0219536 A1    Jul. 28, 2016

(30) Foreign Application Priority Data

Jul. 1, 2013  (KR) .................. 10-2013-0076221

(51) Int. Cl.
*H04W 40/22*  (2009.01)
*H04W 56/00*  (2009.01)
(Continued)

(52) U.S. Cl.
CPC ............ *H04W 56/001* (2013.01); *H04B 3/36* (2013.01); *H04B 7/155* (2013.01); *H04W 56/00* (2013.01)

(58) Field of Classification Search
CPC ...... H04W 56/001; H04W 56/00; H04B 3/36; H04B 7/155
See application file for complete search history.

(56) References Cited

U.S. PATENT DOCUMENTS

2013/0223227 A1*  8/2013  Lee .................. H04B 7/15557
                                                          370/236

FOREIGN PATENT DOCUMENTS

KR   10-2010-0068688 A   6/2010
KR   10-2012-0030615 A   3/2012
(Continued)

OTHER PUBLICATIONS

International Search Report dated Mar. 14, 2014, issued to international Application No. PCT/KR2013/007366.

*Primary Examiner* — Jay P Patel
(74) *Attorney, Agent, or Firm* — Stein IP, LLC (57) ABSTRACT

The present invention relates to fine-tuning a time delay of a relay device that distributes and relays a signal from a femto base station to several antennas by using an unshielded twisted pair cable (UTP). That is, by measuring a UTP time delay between a signal distribution device, which is a component of a UTP femto distribution and relay device, and a plurality of remote signal transmission and reception devices, respectively, a cable time delay between devices is corrected so that the plurality of remote signal transmission and reception devices may relay femtocell signals at the same time. A device for time delay fine-tuning UTP femto distribution/relay includes a signal distribution device that matches with a femtocell and measures a cable delay between the signal distribution device and the remote signal transmission and reception device, and the remote signal transmission and reception device that feeds a signal (Continued)

from the signal distribution device back and accesses a terminal and a femtocell signal wirelessly.

14 Claims, 10 Drawing Sheets

(51) Int. Cl.
*H04B 3/36* (2006.01)
*H04B 7/155* (2006.01)

(56) References Cited

FOREIGN PATENT DOCUMENTS

| KR | 10-2012-0079960 A | 7/2012 |
| KR | 10-2012-0081274 A | 7/2012 |
| KR | 10-2012-0122208 A | 11/2012 |

\* cited by examiner

DEVICE AND METHOD FOR TIME DELAY FINE-TUNING UTP FEMTO DISTRIBUTION AND RELAY

TECHNICAL FIELD

The present invention relates to a device and method for time delay fine-tuning unshielded twisted pair (UTP) femto distribution and relay, and more particularly, to a device and method for time delay fine-tuning UTP femto distribution/relay that measures a time delay between a signal distribution device, which is a component of a UTP femto distribution/relay device, and a plurality of remote signal transmission and reception devices, respectively and corrects a cable time delay in order to distribute a signal from a femto cell to several antennas by using UTP lines and fin-tune a signal time delay between UTP lines so that the plurality of remote signal transmission and reception devices may relay femtocell signals at the same time.

BACKGROUND ART

A relay device is a device that is located between a base station and a terminal to receive and amplify signals from the base station and the terminal. That is, it refers to a device that receives and amplifies a signal from the base station to transmit the amplified signal to the terminal, and receives and amplifies a signal from the terminal to transmit the amplified signal to the base station. The relay device is installed in the place where a wireless transmission and reception condition between the terminal and the base station is bad, to relay a signal and is mostly installed under or in the building where it is difficult for a signal from the base station to arrive at. The structure of the relay device varies depending on a building structure or the characteristic of a shadow area, and when especially used in the building, a relay device in which several antennas are distributed is used.

The distribution/relay device may match and relay an outdoor base station outside the building or match and use a base station for only the distribution/relay device, according to the capacity of a user connected to the distribution/relay device. In the case of long term evolution (LTE), each building matches and uses a small base station, i.e., femtocell because the capacity of data occupied by a user is large.

The distribution/relay device is connected to several distributed antennas by using a coaxial cable. The coaxial cable is characterized in that it is possible to transmit a high-frequency signal used in a base station without a change in frequency as it is. However, since installing the coaxial cable inside the building costs high, a distribution/relay device that uses an UTP line, one of LAN cables has been studied.

As an example, Korean Patent Publication No. 2010-0068688 employs a method that includes converting a high-frequency signal received from a base station or communication system by a wired or wireless connection into a digital signal, and transmitting, by a digital signal processing unit, the digital signal to an Ethernet cable by using time division multiplexing. The technique connects a signal distribution device to a plurality of remote signal transmission and reception devices by an UTP line, a cheap communication cable that has been previously installed without installing a separate cable and relates to a relay device that may transmit an existing internet signal and a mobile communication signal through the UTP cable together.

However, when a high-speed wireless transmission standard is employed between a base station and a terminal, the technique also causes degradation to transmission quality if there are different transmission time delays between a signal distribution device and a plurality of remote signal transmission and reception devices. Thus, in order to correct a time delay between the signal distribution device and the plurality of remote signal transmission and reception devices to enable the plurality of remote signal transmission and reception devices to perform transmission and reception together, there is a need for a study on a device that fine-tunes a time delay between the signal distribution device and the plurality of remote signal transmission and reception devices.

DISCLOSURE OF THE INVENTION

Technical Problem

Embodiments provide a device for time delay fine-tuning unshielded twisted pair (UTP) femto distribution/relay that corrects an UTP cable time delay so that a plurality of remote signal transmission and reception devices are wirelessly connected to a terminal at the same time.

Embodiments also provide a device for time delay fine-tuning unshielded twisted pair (UTP) femto distribution/relay that corrects a time delay to have accuracy within 100 nsec so that there is no impact on LTE communication quality.

Technical Solution

In one embodiment, a signal distribution device includes a signal transmission unit matching a femtocell transmission signal to supply a transmission signal to a remote signal transmission and reception device; a signal reception unit calculating a feedback signal delay with the remote signal transmission and reception device based on the transmission signal fed back and received from the remote signal transmission and reception device, a signal from a terminal to be connected to a femtocell, and a signal from the signal transmission unit, removing the signal fed back, and relaying the signal from the terminal to the femtocell; and a signal distribution device control unit transmitting calculated signal delay information to the remote signal transmission and reception device.

The signal transmission unit may include an UTP converter that matches with an UTP line, and the signal reception unit may include an UTP converter that matches with an UTP line.

The signal transmission unit may match with the signal distribution device in a baseband IQ transmission signal, and the signal reception unit may match with the signal transmission device in a baseband IQ transmission signal.

The signal transmission unit may include at least one time delay measurement module measuring a time delay with the remote signal transmission and reception device; and a feedback signal mixer synthesizing outputs from the at least one time delay measurement module.

The signal reception unit may include a time delay measurement unit measuring a time delay of the feedback signal; and a feedback signal removal unit removing the feedback signal to transmit only a signal from a terminal to a femtocell.

The signal reception unit may measure the time delay with an error within 100 nsec.

In another embodiment, a time delay fine-tuning UTP femto distribution/relay device may include a signal transmission unit matching a femtocell transmission signal to supply a transmission signal to a signal feedback unit; a signal feedback unit feeding the transmission signal transmitted by the signal transmission unit back to a signal reception unit; the signal reception unit receiving the transmission signal fed back and received from the signal feedback unit and a terminal signal that is received together from the signal feedback unit, calculating a signal delay with the signal feedback unit, removing the signal fed back, and relaying the terminal signal to a femtocell; a signal distribution device control unit transmitting the calculated signal delay information to a remote signal transmission and reception device control unit; the remote signal transmission and reception device control unit controlling a transmission signal time delay unit and a reception signal time delay unit based on signal delay information transmitted by the signal distribution device control unit; the transmission signal time delay unit time-delaying a signal from the signal transmission unit by control of the remote signal transmission and reception device control unit, and wirelessly transmitting the time-delayed signal to a terminal; and the reception signal time delay unit time-delaying a wireless signal from the terminal by control of the remote signal transmission and reception device control unit, and transmitting the time-delayed signal to the signal feedback unit.

The transmission signal time delay unit may include at least one transmission signal time delay unit, and the reception signal time delay unit may include at least one reception signal time delay unit.

The transmission time delay unit may time-delay with one or more delay devices that have a delay characteristic within up to 100 nsec, and the reception time delay unit may time-delay with one or more delay devices that have a delay characteristic within up to 100 nsec.

The signal feedback unit may include a gain adjustment device adjusting a gain of a feedback signal; and a feedback signal mixer synthesizing an output from the gain adjustment device that feeds the signal transmission unit back, and an output from the reception signal time delay unit that time-delays a wireless signal from the terminal.

In further another embodiment, a time delay fine-tuning UTP femto distribution/relay method includes a signal transmission step in which a transmission signal from a femtocell is transmitted to a remote signal transmission and reception device; a transmission signal feedback step in which the transmission signal from the femtocell that is received by the remote signal transmission and reception device is fed back to a signal distribution device; a feedback signal reception step in which a feedback signal of the femtocell transmission signal fed back from the remote signal transmission and reception device is received; a feedback signal time delay measurement step in which a time delay between the femtocell transmission signal and the signal fed back is measured; a time delay correction information transmission step in which time delay correction information is transmitted to the remote signal transmission and reception device for correction of the measured time delay; a transmission signal time delay correction step in which a time delay of the femtocell transmission signal is corrected by control of the signal distribution device; and a reception signal time delay correction step in which a reception signal time delay of a terminal is corrected by control of the signal distribution device.

The femtocell may be replaced with a microcell or picocell.

Advantageous Effects

A device for time delay fine-tuning unshielded twisted pair (UTP) femto distribution/relay has an advantage in that an UTP cable time delay is corrected so that a plurality of remote signal transmission and reception devices are wirelessly connected to a terminal at the same time.

The device for time delay fine-tuning unshielded twisted pair (UTP) femto distribution/relay also has an effect in that it corrects a time delay within 100 nsec so that there is no impact on LTE communication quality.

MODE FOR CARRYING OUT THE INVENTION

In the following, exemplary embodiments of the present invention are described with reference to the accompanying drawings.

Figure 1:
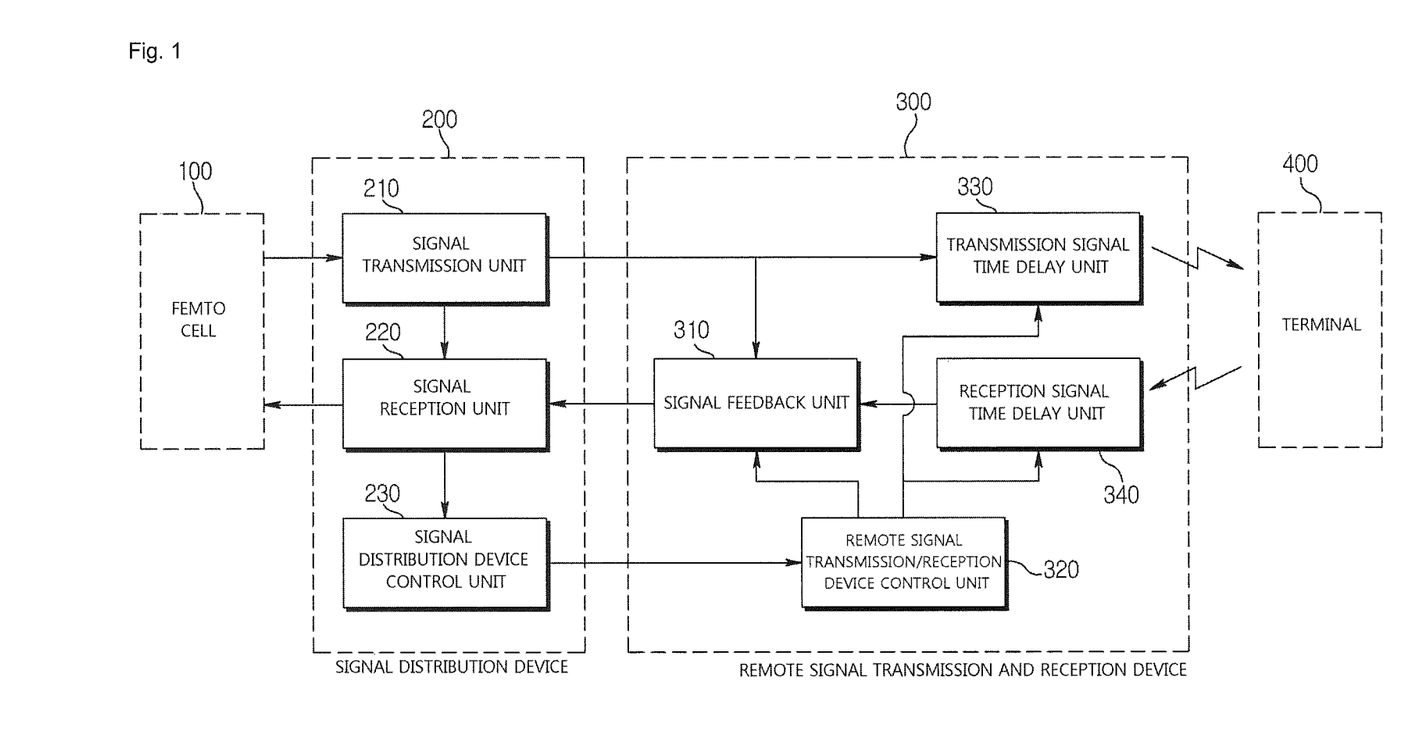
FIG. 1 is a detailed block diagram of a time delay fine-tuning UTP femto distribution/relay device according to an embodiment of the present invention.

FIG. 1 is a detailed block diagram of a time delay fine-tuning UTP femto distribution/relay device according to an embodiment of the present invention.

As shown in FIG. 1, the time delay fine-tuning UTP femto distribution/relay device according to the present invention includes a signal distribution device 200 that matches with a femto cell 100, transmits and receives a signal to and from a remote signal transmission and reception device 300, and a remote signal transmission and reception device 300 that is connected to the signal distribution device 100 and wirelessly matches a signal with a terminal.

In this example, the femtocell 100 supplies transmission and reception signals for matching with the terminal 400 to the signal distribution device 200 and is a small mobile communication base station that provides a mobile communication service to the terminal 400 that is located in a small area. That is, the femtocell 100 plays a role in providing a mobile communication service through a wireless connection to the terminal 400, like a base station.

The connection between the femtocell 100 and the signal distribution device 200 generally matches at an RF frequency but is not efficient when the femtocell 100 and the signal distribution device 200 are integrated to be a single device. Typically, simultaneously with performing a function of converting a baseband IQ digital signal into an RF signal in the femtocell 100, the signal distribution device 200 has to re-convert the RF signal into the baseband IQ digital signal for the connection between the signal distribution device 200 and the remote signal transmission and reception device 300. Thus, for efficient matching, the connection between the femtocell 100 and the signal distribution device 200 may match in the baseband IQ digital signal from which an RF conversion function has been removed.

The signal distribution device 200 matches with the femtocell 100, transmits and receives a signal to and from the remote signal transmission and reception device 300, and includes a signal transmission unit 210 that matches a transmission signal with the femtocell 100 in the baseband IQ digital signal, a signal reception unit 220 that matches a reception signal with the femtocell 100 in the baseband IQ digital signal, and a signal distribution device control unit 230 that controls the signal distribution device 200.

The signal transmission and reception unit 210 that matches the transmission signal with the femtocell 100 in make the baseband IQ digital signal performs UTP conversion to match with the remote signal transmission and reception device 300. The UTP conversion refers to converting into a modulation mode suitable for an UTP line.

The signal reception unit 220 that matches the reception signal with the femtocell 100 in the baseband IQ digital signal performs a function of converting the signal received from an UTP cable into the baseband IQ digital signal to transmit the converted signal to the femtocell 100. Also, it includes a function of measuring a time delay between the signal distribution 200 and the remote signal transmission and reception device 300.

In the case of LTE, there is no performance degradation only when a transmission and reception time difference between the plurality of remote signal transmission and reception devices 300 does not exceed 100 nsec. That is, there is no performance degradation only when a time difference when arriving at the terminal 400 does not exceed 100 nsec and a time difference when being transmitted to the femtocell 100 by the terminal 400 does not exceed 100 nsec. Thus, the signal reception unit 220 may measure a time delay between the signal distribution device 200 and the remote signal transmission and reception device 300 at accuracy within 100 nsec.

The signal distribution device control unit 230 that controls the signal distribution device 200 performs a function of transmitting a time delay measured by the signal reception unit 220 to the remote signal transmission and reception device 300. The signal distribution device control unit 230 performs UTP conversion in order to transmit the measured time delay to the remote signal transmission and reception device 300.

The remote signal transmission and reception device 300 wirelessly is connected to the signal distribution device 200 to match a signal with the terminal 400 and includes a signal feedback unit 310 that feeds the transmission signal transmitted by the signal distribution device 200 back to the signal distribution device 200, a remote signal transmission and reception device control unit 320 that controls the remote signal transmission and reception device 300, a remote signal transmission and reception device 300 that time-delays the transmission signal transmitted by the signal distribution device 200, and a reception signal time delay unit 340 that time-delays the reception signal received from the terminal 400.

The signal feedback unit 310 that feeds the transmission signal transmitted by the signal distribution device 200 back to the signal distribution device 200 mixes the transmission signal transmitted by the signal distribution device 200 with an output from the reception signal time delay unit 340 by the control of the remote signal transmission and reception device control unit 320 and re-transmits the mixed signal to the signal distribution device 200. The re-transmitted signal is used to measure a cable time delay between the signal distribution device 200 and the remote signal transmission and reception device 300 at the signal distribution device 200.

The remote signal transmission and reception device control unit 320 that controls the remote signal transmission and reception device 300 is signal time delay controlled by the signal distribution device 200 to set the time delay of the transmission signal time delay unit 330, and the set time delay enables the plurality of remote signal transmission and reception devices 300 to transmit the same signal together.

Also, the remote signal transmission and reception device control unit 320 is signal time delay controlled by the signal distribution device 200 to set the time delay of the reception signal time delay unit 340, and the set time delay enables the femtocell 100 to equally receive the signal from the terminal 400 received by the plurality of remote signal transmission and reception devices 300.

The transmission signal time delay unit 330 that time-delays the transmission signal transmitted by the signal distribution device 200 includes a time delay device that may set a time delay. That is, the time delay is set by the control of the remote signal transmission and reception device control unit 320 and may be set at accuracy within 100 nsec. The transmission signal time delay unit 330 may further includes an RF circuit, a power amplifier, and an antenna to match with the terminal 400 wirelessly.

The reception signal time delay unit 340 that time-delays the reception signal received from terminal 400 includes a time delay device that may set a time delay. That is, the time delay is set by the control of the remote signal transmission and reception device control unit 320 and may be set at accuracy within 100 nsec, like the transmission signal time delay unit 330. The reception signal time delay unit 340 may further includes an RF circuit, a low noise amplifier, and an antenna to match with the terminal 400 wirelessly.

The terminal 400 is to match a signal with the remote signal transmission and reception device 300 wirelessly and matches with the plurality of remote signal transmission and reception devices. Only when due to the characteristic of LTE, the terminal 400 receives the signals transmitted by the plurality of remote signal transmission and reception devices 300 within 100 nsec, there is no impact on downlink signal quality, and even in the case that the femtocell 100 receives the signal transmitted by a single terminal 400 through the plurality of remote signal transmission and reception devices 300, there is no impact on uplink signal quality only when the signal is received within 100 nsec.

MODE FOR CARRYING OUT INVENTION

Figure 2:
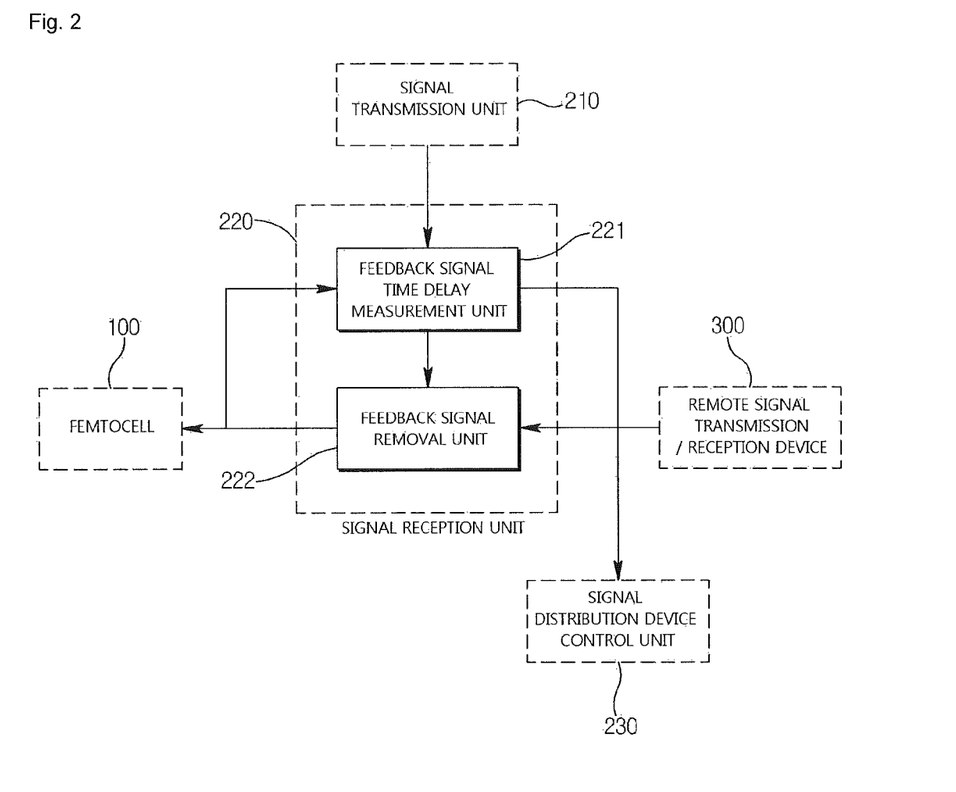
FIG. 2 is a detailed block diagram of a signal reception unit in FIG. 1.

FIG. 2 is a detailed block diagram of the signal reception unit in FIG. 1.

As shown in FIG. 2, the signal reception unit 220 includes a feedback signal time delay measurement unit 221 that measures the time delay of a feedback signal, and a feedback signal removal unit 222 that removes the feedback signal.

The feedback signal time delay measurement unit 221 measures the time delay of a feedback signal and namely, it measures the time delay between a signal from the signal transmission unit 210 and a signal fed back from the remote signal transmission and reception device 300. That is, the signal transmitted by the signal transmission unit 210 is fed back from the remote signal transmission and reception device 300 as the same signal without signal processing.

Thus, the feedback signal time delay measurement unit 221 may accurately identify the removal position of the signal fed back and measures the cable time delay between the signal distribution device 200 and the remote signal transmission and reception device 300 based on the accurately identified position. Measured time delay information is provided to the signal distribution device control unit 230 and transmitted to the remote signal transmission and reception device 300. Also, it is desirable to predict time delays that are fundamentally generated in the signal distribution device 200 and the remote signal transmission and reception device 300, and further use a fixed time delay in the feedback signal time delay measurement unit 221 to decrease a circuit size.

The feedback signal removal unit 222 removes a feedback signal and namely, it performs a function of completely removing a feedback signal transmitted by the remote signal transmission and reception device 300. Since the signal transmitted by the remote signal transmission and reception device 300 actually includes a signal transmitted by the terminal 400 as well as the feedback signal, the feedback signal used for signal time delay measurement has to be completely removed. The feedback signal removal unit 222 may include an UTP conversion function in order to match with the remote signal transmission and reception device 300.

Figure 3:
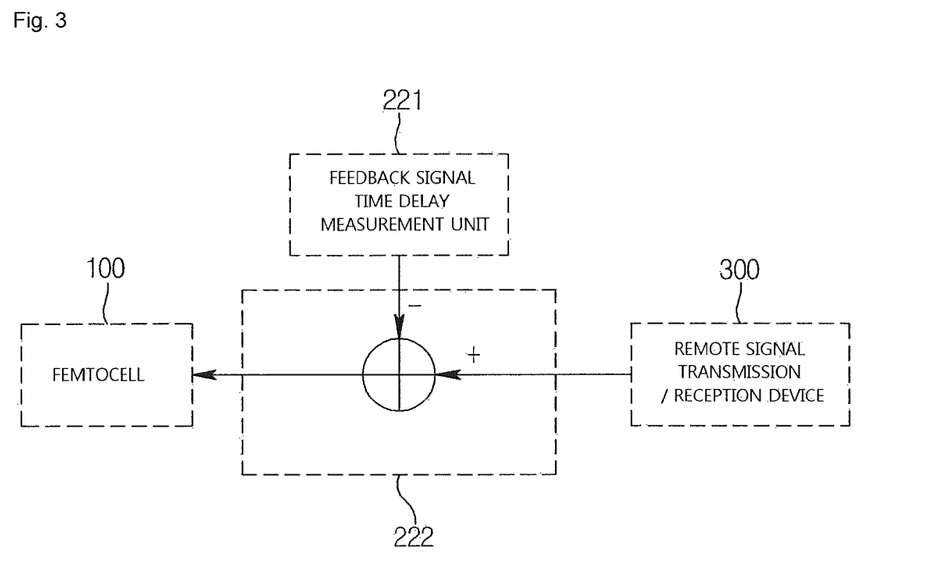
FIG. 3 is a detailed block diagram of a feedback signal removal unit in FIG. 2.

FIG. 3 is a detailed block diagram of the feedback signal removal unit in FIG. 2.

As shown in FIG. 3, the feedback signal removal unit 222 has a structure in which two or more signals are mixed, and removes only a feedback signal from signals transmitted by the remote signal transmission and reception device 300. Since the feedback signal is the same signal as a transmission signal, it is completely removed by the accurate measurement of a cable time delay.

Figure 4:
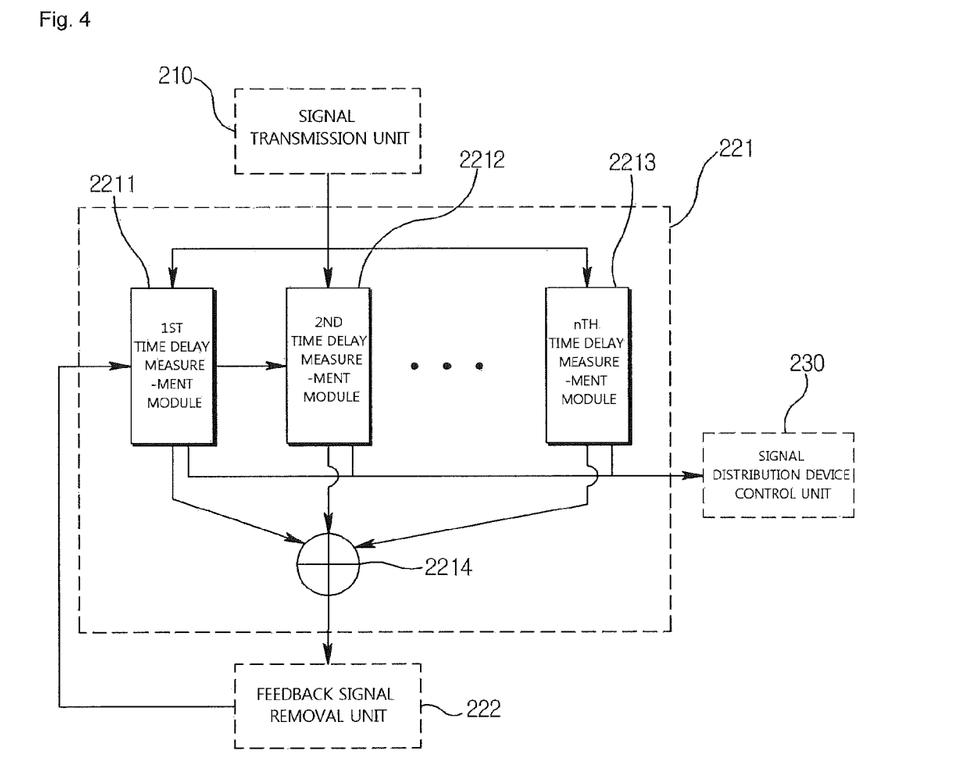
FIG. 4 is a detailed block diagram of a feedback signal time delay measurement unit in FIG. 2.

FIG. 4 is a detailed block diagram of the feedback signal time delay measurement unit 221 in FIG. 2.

As shown in FIG. 4, the feedback signal time delay measurement unit 221 includes a plurality of time delay measurement modules 2211 to 2213 and a signal mixer 2214 in order to measure time delay.

Since the plurality of time delay measurement modules 2211 to 2213 includes a time delay interval within 100 nsec, it is possible to compare a signal output from the feedback signal removal unit 221 with a signal output from the signal transmission unit 210 within 100 nsec. When the same signal as the cable delay is detected among the time delay measurement modules 2211 to 2213, outputs from corresponding time are supplied to the feedback signal mixer 2214.

The signal supplied to the feedback signal mixer 2214 is input to the feedback signal removal unit 222 to remove a feedback signal so that the feedback signal is not output. In this example, the feedback signal mixer 2214 mixes time-delayed transmission signals from the signal transmission unit 210 that are output from the plurality of time delay measurement modules 2211 to 2213.

Figure 5:
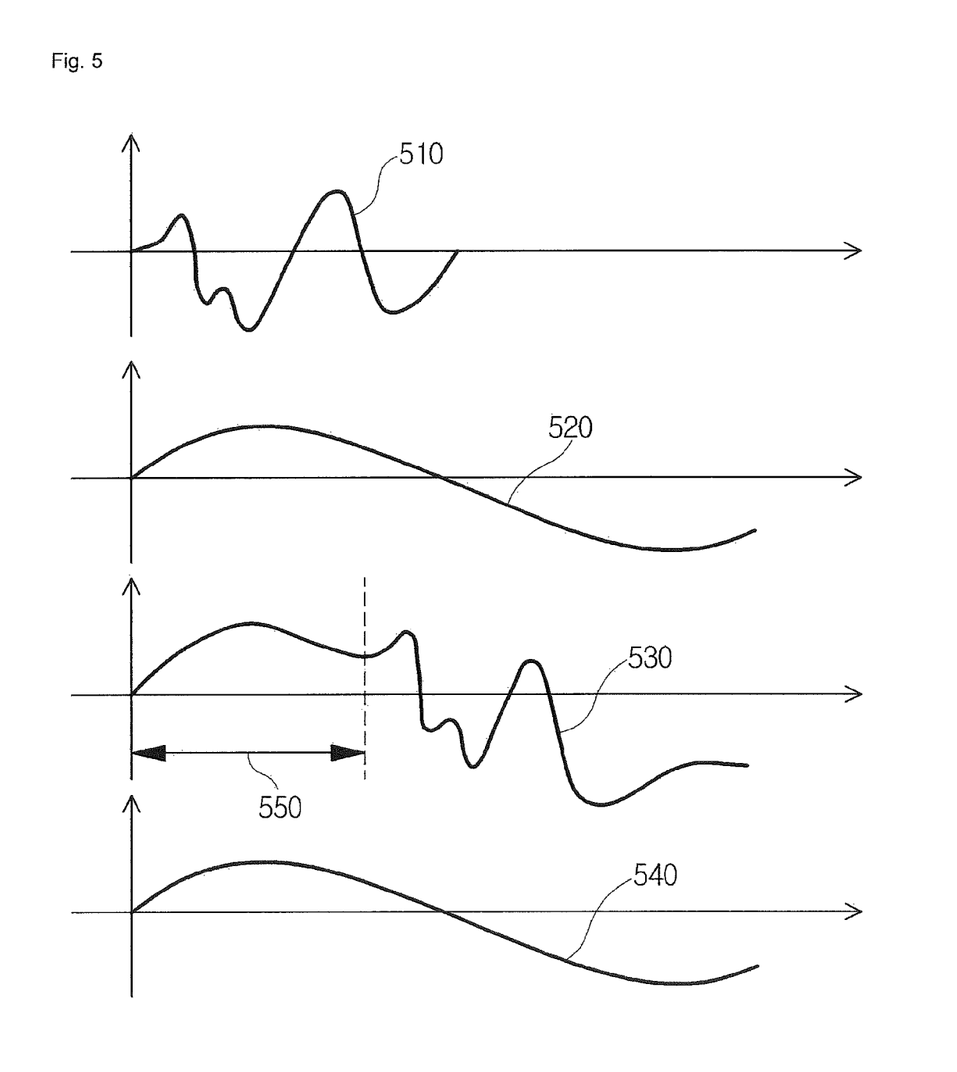
FIG. 5 is a timing diagram of a signal characteristic related to feedback signal time delay measurement in FIG. 1.

FIG. 5 is a timing diagram of a signal characteristic related to feedback signal time delay measurement in FIG. 1.

As shown in FIG. 5, a signal transmission unit output 510 is an output signal from the signal transmission unit 210 and namely, it is a signal that is generated in order to be transmitted from the femtocell 110 to the terminal 400. In the case of LTE, a transmission signal from the femtocell 100 employs orthogonal frequency division multiplexing (OFDM) and an example of a signal is enlarged and displayed.

A signal feedback unit input 520 is an input to the signal feedback unit 310 and namely, it represents a transmission signal from the terminal 400 that is received by the reception signal time delay unit 340. In the case of LTE, a transmission signal from the terminal 400 employs single-carrier frequency division multiple access (SC-FDMA) and an example of a signal is enlarged and displayed.

A signal feedback unit output 530 is an output signal from the signal feedback unit 310 and it may be seen that a transmission signal from the signal distribution device 200 and an output signal from the reception signal time delay unit 340 are mixed. That is, a transmission signal from the terminal 400 and a transmission signal from the femtocell 100 are overlapped and the overlapped signal is transmitted to the signal distribution device 200. Thus, the signal distribution device 200 may compare the signal transmission unit output 510 signal with an output signal from the signal feedback unit output 530 to measure time delay 550 in which the signal transmission unit output 510 signal is fed back.

A signal reception unit output 540 is an output from the signal reception unit 220 and namely, only a signal from the terminal 400 is output by removing a signal that a transmission signal from the signal distribution device 200 is fed back, from signals transmitted by the signal feedback unit 310.

The time delay 550 represents a time delay between the signal distribution device 200 and the remote signal transmission and reception device 300 and more particularly represents a round trip time delay T_round_trip_delay between the signal distribution device 200 and the remote signal transmission and reception device 300. Thus, a unidirectional cable time delay T_transmission_delay between the signal distribution device 200 and the remote signal transmission and reception device 300 is calculated by the round trip time delay T_round_trip_delay between the signal distribution device 200 and the remote signal transmission and reception device 300 and a system time delay T_system_delay in the signal distribution device 200 and the remote signal transmission and reception device 300, as represented in the following equation.

$$T\_transmission\_delay=(T\_round\_trip\_delay-T\_system\_delay)/2$$

In this example, since the system time delay T_system_delay is a fixed time delay, it is desirable to use a fixed time delay in the feedback signal time delay measurement unit 221 to decrease a circuit size.

Figure 6:
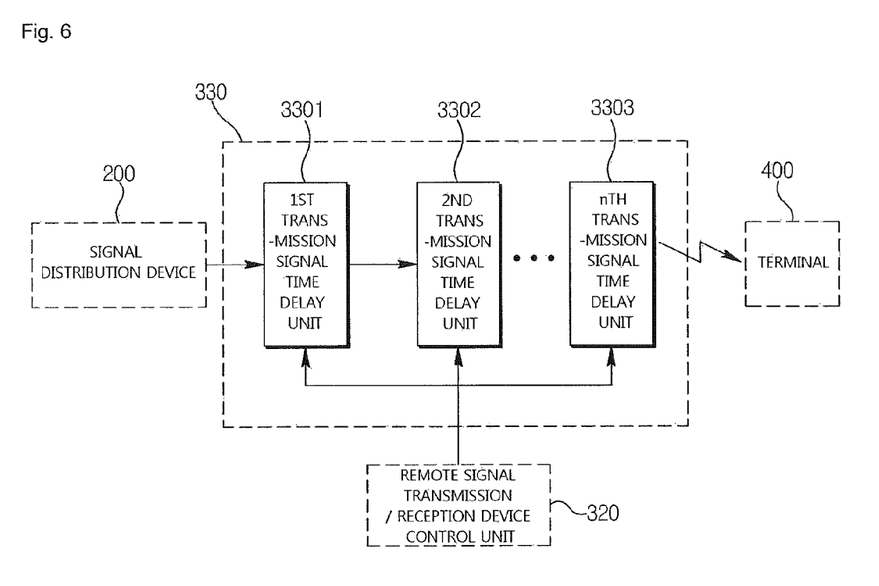
FIG. 6 is a detailed block diagram of a transmission signal time delay unit in FIG. 1.

FIG. 6 is a detailed block diagram of the transmission signal time delay unit 330 in FIG. 1.

As shown in FIG. 6, the transmission signal time delay unit 330 has a structure in which a plurality of transmission time delay units 3301 to 3303 are serially connected. Thus, since a transmission signal transmitted by the signal distribution device 200 is supplied to the terminal 400 through N transmission time delay units 3301 to 3303, a time delay T_tx_delay controlled by the transmission signal time delay unit 330 is calculated by the multiplication of a fundamental time delay T_fundamental generated by a single transmission time delay unit 3301, 3302, or 3303 and the number N of the transmission time delay units 3301 to 3303 as follows.

$$T\_tx\_delay=T\text{fundamental}*N$$

In this example, the number N of the transmission time delay units 3301 to 3303 is controlled by the remote signal transmission and reception device control unit 320 and is set so that the plurality of remote signal reception devices 300 may transmit together. Also, the transmission time delay units 3301 to 3303 may time delay with one or more delay devices that have a delay characteristic within up to 100 nsec.

Figure 7:
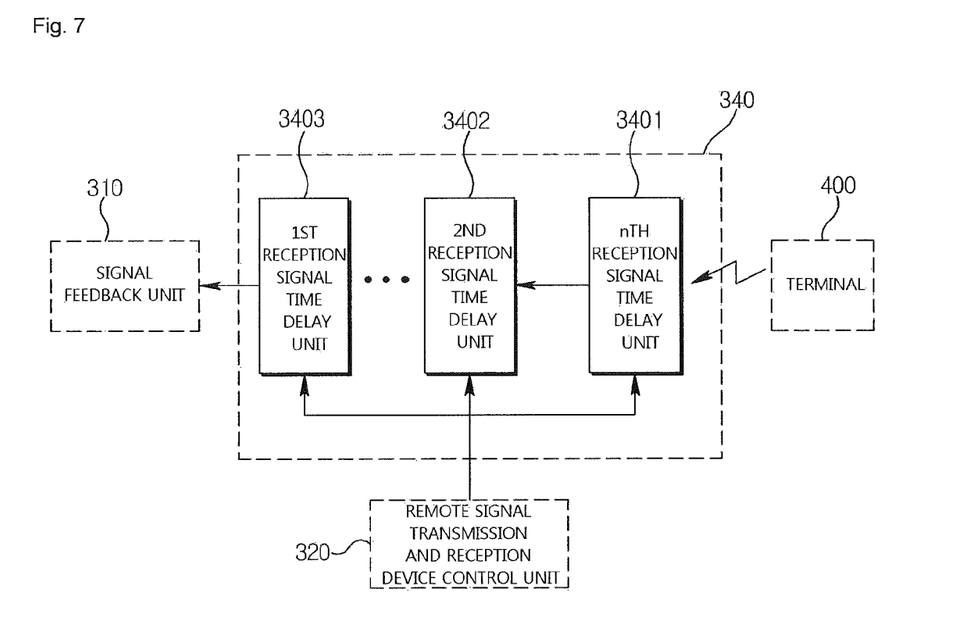
FIG. 7 is a detailed block diagram of a reception signal time delay unit in FIG. 1.

FIG. 7 is a detailed block diagram of the reception signal time delay unit 340 in FIG. 1.

As shown in FIG. 7, the reception signal time delay unit 340 has a structure in which a plurality of reception time delay units 3401 to 3403 are serially connected. Thus, since a reception signal transmitted by the terminal 400 is supplied to the signal feedback unit 310 through N reception time delay units 3401 to 3403, a time delay T_rx_delay controlled by the reception signal time delay unit 340 is calculated by the multiplication of a fundamental time delay T_fundamental generated by a single reception time delay unit 3401, 3402, or 3403 and the number N of the reception time delay units 3401 to 3403 as follows.

$$T\_rx\_delay = T\text{fundamental} * N$$

In this example, the number N of the reception time delay units 3401 to 3403 is controlled by the remote signal transmission and reception device control unit 320 and is set so that signals from the terminal 400 that are transmitted through the plurality of remote signal reception devices 300 may be received by the femtocell 100 together. Also, the reception time delay units 3401 to 3403 may time delay with one or more delay devices that have a delay characteristic within up to 100 nsec.

Figure 8:
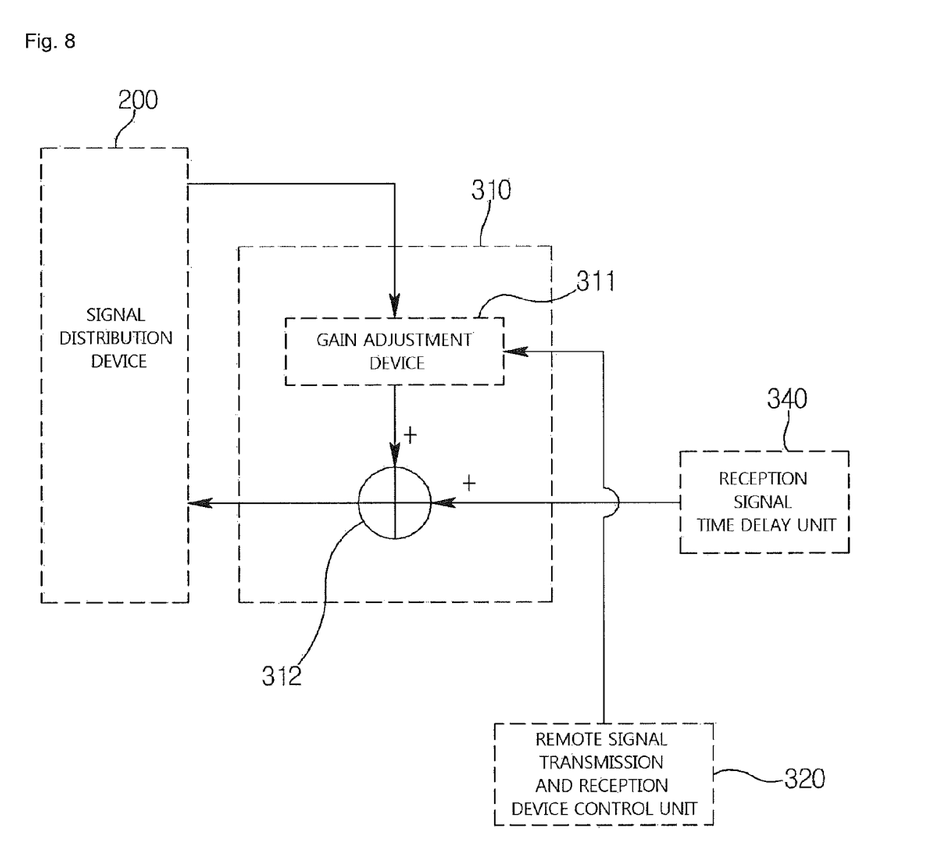
FIG. 8 is a detailed block diagram of a signal feedback unit in FIG. 1.

FIG. 8 is a detailed block diagram of the signal feedback unit 310 in FIG. 1.

As shown in FIG. 8, it includes a gain adjustment device 311 that feeds a signal back from the signal distribution device 200, and a feedback signal mixer 312 that mixes a signal from the reception signal time delay unit 340 with an output from the gain adjustment device 311.

The gain adjustment device 311 is controlled by the remote transmission and reception device control unit 320 to adjust a feedback gain. When the feedback signal is greater than the output from the reception signal time delay unit 340, there is a limitation in that a reception signal is affected. Also, when the feedback signal is less than the reception signal time delay unit 340, there is a difficulty in time delay measurement between the signal distribution device 200 and the remote signal transmission and reception device 300 because it is difficult to later detect the feedback signal from the signal distribution device 200.

Thus, the gain of the gain adjustment device 311 is controlled by the signal distribution device 200 so that the feedback signal from the signal distribution device 200 may be easily detected.

Figure 9:
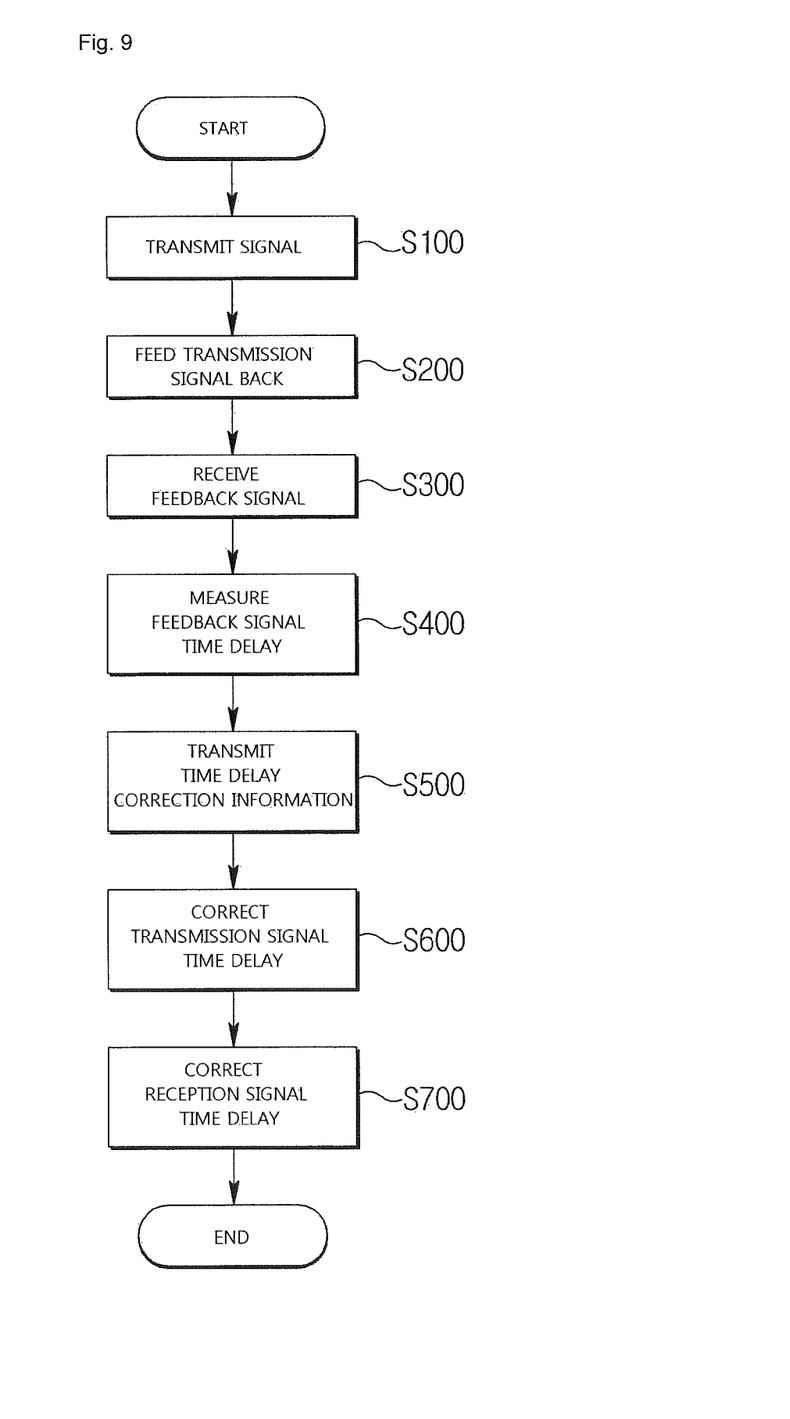
FIG. 9 is a detailed signal flow diagram of a time delay fine-tuning UTP femto distribution/relay device according to an embodiment of the present invention.

As shown in FIG. 9, the time delay fine-tuning UTP femto distribution/delay device according to the present invention includes a signal transmission step S100 in which a transmission signal from the femtocell 100 is transmitted to the remote signal transmission and reception device 300, a transmission signal feedback step S200 in which the transmission signal from the femtocell 100 is fed back to the signal distribution device 200, a feedback signal reception step S300 in which the signal fed back from the remote signal transmission and reception device 300 is received, a feedback signal time delay measurement step S400 in which the time delay of the signal fed back is measured, a time delay correction control step S500 in which time delay correction information is provided to the remote signal transmission and reception device 300 for the correction of the measured time delay, a transmission signal time delay correction step S600 in which the time delay of the transmission signal from the femtocell 100 is corrected by the control of the signal distribution device 200, and a reception signal time delay correction step S700 in which the time delay of the reception signal of the femtocell 100 is corrected by the control of the signal distribution device 200.

In the signal transmission step S100, a transmission signal from the femtocell 100 is transmitted to the remote signal transmission and reception device 300 and namely, the signal transmission unit 210 matches the transmission signal from the femtocell 100 and transmits the matched signal to the remote signal transmission and reception device 300.

In the transmission signal feedback step S200, the transmission signal from the femtocell 100 is fed back to the signal distribution device 200 and namely, the signal is fed back by the control of the remote signal transmission and reception device control unit 320.

In the feedback signal reception step S300, the signal fed back from the remote signal transmission and reception device 300 is received and namely, the signal reception signal 210 receives a signal so that the signal fed back from the signal feedback unit 310 is received.

In the feedback signal time delay measurement step S400, the time delay of the signal fed back is measured and namely, a time delay between a signal transmitted by the signal transmission unit 210 and a signal transmitted by the signal feedback unit 310 is measured so that a cable time delay between the signal distribution device 200 and the remote signal transmission and reception device 300 is measured.

In the time delay correction information transmission step S500, time delay correction information is provided to the remote signal transmission and reception device 300 for the correction of the measured time delay and namely, correction information on a measured cable time delay is transmitted so that the remote signal transmission and reception device 300 may correct the time delay measured by the signal distribution device 200.

In the transmission signal time delay correction step S600, the cable time delay is corrected by the correction information on the time delay that has been provided to the signal distribution device 200 and namely, a transmission signal is time-delayed by the control of the remote signal transmission and reception device control unit 320 so that a plurality of remote signal transmission and reception devices may transmit transmission signals from the femtocell 100 together based on the time delay measured by the signal reception unit 220.

In the reception signal time delay correction step S700, the cable time delay is corrected by the control of the signal distribution device 200 and namely, a reception signal is time-delayed by the control of the remote signal transmission and reception device control unit 320 so that signals from the terminal may be transmitted to the femtocell 100 together through a plurality of remote signal transmission and reception devices based on the time delay measured by the signal reception unit 220.

Figure 10:
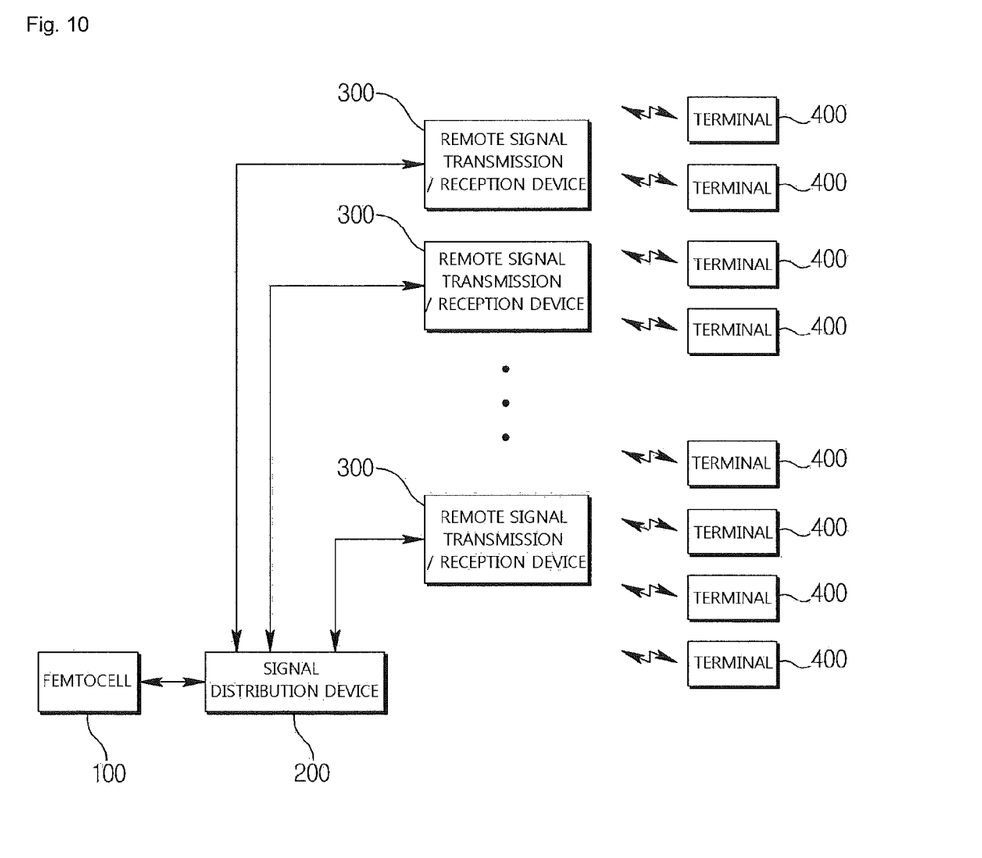
FIG. 10 is a conceptual view of the use of FIG. 1.

FIG. 10 is a conceptual view of the use of FIG. 1.

As shown in FIG. 10, a single femtocell 100 matches with a single signal distribution device 200, the signal distribution device is connected to a plurality of remote signal transmission and reception devices 300 through UTP, and a plurality of terminals 400 are connected to a single remote signal transmission and reception device 300.

The terminal 400 may receive the same femtocell 100 signal from the plurality of remote signal transmission and reception devices 300, in which case there is no impact on transmission quality only when a time difference between signals received from the plurality of remote signal transmission and reception devices 300 is within 100 nsec. Thus, the plurality of remote signal transmission and reception device 300 corrects a time delay between the signal distribution device 200 and the remote signal transmission and reception device 300 to be capable of transmitting the signals of the femtocell 100 together.

Also, a single terminal 400 may be received by the femtocell 100 through the plurality of remote signal transmission and reception devices 300, in which case there is no impact on reception quality only when a time difference generated at the plurality of remote signal transmission and reception devices 300 is within 100 nsec. Thus, the plurality of remote signal transmission and reception device 300 corrects a time delay between the signal distribution device 200 and the remote signal transmission and reception device 300 to enable the signals of the terminal 400 to be received by the femtocell 100 together.

As such, the time delay fine-tune UTP femto distribution/relay device according to the present invention has an advantage in that a cable time delay is corrected so that the plurality of remote signal transmission and reception devices 300 is wirelessly connected to the terminal 400 at the same time, and has an effect in that there is no impact on LTE communication quality by correcting a time delay within 100 nsec.

Also, since a matching method between the femtocell 100 and the signal distribution device 200 may also be used for a macrocell or picocell matching method instead of the femtocell 100 without a change, the femtocell 100 may also be applied to the macrocell and the picocell without a limitation to the femtocell 100.

INDUSTRIAL APPLICABILITY

The present invention may be applied to a device and method that distributes a signal from a femtocell to several antennas by using a unshielded twisted pair (UTP) and fine-tunes a signal time delay between UTP lines.

The invention claimed is:

1. A signal distribution device comprising:
a signal transmission unit matching a femtocell transmission signal to supply a transmission signal to a remote signal transmission and reception device;
a signal reception unit calculating a feedback signal delay with the remote signal transmission and reception device based on the transmission signal fed back and received from the remote signal transmission and reception device, a signal from a terminal to be connected to a femtocell, and a signal from the signal transmission unit, removing the signal fed back, and relaying the signal from the terminal to the femtocell; and
a signal distribution device control unit transmitting calculated signal delay information to the remote signal transmission and reception device.

2. The signal distribution device of claim 1, wherein the signal transmission unit comprises an UTP converter that matches with an UTP line, and the signal reception unit comprises an UTP converter that matches with an UTP line.

3. The signal distribution device of claim 1, wherein the signal transmission unit matches with the signal distribution device in a baseband IQ transmission signal, and the signal reception unit matches with the signal transmission device in a baseband IQ transmission signal.

4. The signal transmission unit of claim 1, wherein the signal transmission unit comprises:
at least one time delay measurement module measuring a time delay with the remote signal transmission and reception device; and
a feedback signal mixer synthesizing outputs from the at least one time delay measurement module.

5. The signal distribution device of claim 1, wherein the signal reception unit comprises:
a time delay measurement unit measuring a time delay of the feedback signal; and
a feedback signal removal unit removing the feedback signal to transmit only a signal from a terminal to a femtocell.

6. The signal distribution device of claim 1, wherein the signal reception unit measures the time delay with an error within 100 nsec.

7. The signal distribution device of claim 1, wherein the femtocell is replaced with a microcell or picocell.

8. A time delay fine-tuning UTP femto distribution/relay device comprising:
a signal transmission unit matching a femtocell transmission signal to supply a transmission signal to a signal feedback unit;
a signal feedback unit feeding the transmission signal transmitted by the signal transmission unit back to a signal reception unit;
the signal reception unit receiving the transmission signal fed back and received from the signal feedback unit and a terminal signal that is received together from the signal feedback unit, calculating a signal delay with the signal feedback unit, removing the signal fed back, and relaying the terminal signal to a femtocell;
a signal distribution device control unit transmitting the calculated signal delay information to a remote signal transmission and reception device control unit;
the remote signal transmission and reception device control unit controlling a transmission signal time delay unit and a reception signal time delay unit based on signal delay information transmitted by the signal distribution device control unit;
the transmission signal time delay unit time-delaying a signal from the signal transmission unit by control of the remote signal transmission and reception device control unit, and wirelessly transmitting the time-delayed signal to a terminal; and
the reception signal time delay unit time-delaying a wireless signal from the terminal by control of the remote signal transmission and reception device control unit, and transmitting the time-delayed signal to the signal feedback unit.

9. The time delay fine-tuning UTP femto distribution/relay device of claim 8, wherein the transmission signal time delay unit comprises at least one transmission signal time delay unit, and the reception signal time delay unit comprises at least one reception signal time delay unit.

10. The time delay fine-tuning UTP femto distribution/relay device of claim 8, wherein the transmission time delay unit time-delays with one or more delay devices that have a delay characteristic within up to 100 nsec, and the reception time delay unit time-delays with one or more delay devices that have a delay characteristic within up to 100 nsec.

11. The time delay fine-tuning UTP femto distribution/relay device of claim 8, wherein the signal feedback unit comprises:
a gain adjustment device adjusting a gain of a feedback signal; and a feedback signal mixer synthesizing an output from the gain adjustment device that feeds the signal transmission unit back, and an output from the reception signal time delay unit that time-delays a wireless signal from the terminal.

12. The time delay fine-tuning UTP femto distribution/relay device of claim 8, wherein the femtocell is replaced with a microcell or picocell.

13. A time delay fine-tuning UTP femto distribution/relay method comprising:
- a signal transmission step in which a transmission signal from a femtocell is transmitted to a remote signal transmission and reception device;
- a transmission signal feedback step in which the transmission signal from the femtocell that is received by the remote signal transmission and reception device is fed back to a signal distribution device;
- a feedback signal reception step in which a feedback signal of the femtocell transmission signal fed back from the remote signal transmission and reception device is received;
- a feedback signal time delay measurement step in which a time delay between the femtocell transmission signal and the signal fed back is measured;
- a time delay correction information transmission step in which time delay correction information is transmitted to the remote signal transmission and reception device for correction of the measured time delay;
- a transmission signal time delay correction step in which a time delay of the femtocell transmission signal is corrected by control of the signal distribution device; and
- a reception signal time delay correction step in which a reception signal time delay of a terminal is corrected by control of the signal distribution device.

14. The time delay fine-tuning UTP femto distribution/relay method of claim 13, wherein the femtocell is replaced with a microcell or picocell.

* * * * *